US012768310B2

(12) United States Patent
Kim

(10) Patent No.: US 12,768,310 B2
(45) Date of Patent: Oct. 20, 2026

(54) APPARATUS AND METHOD FOR PREVENTING MALFUNCTION OF VEHICLE ENGINE

(71) Applicants: HYUNDAI MOTOR COMPANY, Seoul (KR); KIA CORPORATION, Seoul (KR)

(72) Inventor: Yong Hyun Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 19/205,259

(22) Filed: May 12, 2025

(65) Prior Publication Data

US 2026/0168453 A1 Jun. 18, 2026

(30) Foreign Application Priority Data

Dec. 16, 2024 (KR) ........................ 10-2024-0187743

(51) Int. Cl.

*F02D 41/22* (2006.01)
*F02D 29/02* (2006.01)
*F02D 41/06* (2006.01)

(52) U.S. Cl.

CPC ........... *F02D 41/062* (2013.01); *F02D 29/02* (2013.01); *F02D 41/22* (2013.01); *F02D 2200/101* (2013.01)

(58) Field of Classification Search

CPC ........ F02D 41/062; F02D 41/22; F02D 41/14; F02D 41/24; F02D 29/02; F02D 45/00;

(Continued)

(56) References Cited

U.S. PATENT DOCUMENTS 4,648,364 A * 3/1987 Wills ...................... F02B 77/08 123/198 DB
4,667,176 A * 5/1987 Matsuda .................. B60Q 9/00 340/459

(Continued)

FOREIGN PATENT DOCUMENTS

KR 10-2367503 B1 2/2022
WO WO-2018179762 A1 * 10/2018 ............. F02D 45/00

*Primary Examiner* — Grant Moubry
(74) *Attorney, Agent, or Firm* — MCDONNELL BOEHNEN HULBERT & BERGHOFF LLP

(57) ABSTRACT

A technique capable of preventing unintended vehicle starting due to a breakdown includes a vehicle engine malfunction preventing apparatus includes a memory configured to store a pre-selected failure variable list and a diagnostic release variable list, and a processor configured to diagnose whether a vehicle engine is malfunctioning based on the failure variable list. The processor is configured to obtain first vehicle status information corresponding to a failure variable based on the failure variable list, diagnose the vehicle engine as a malfunction to turn off the vehicle engine when the obtained first vehicle status information satisfies a preset diagnostic condition, obtain second vehicle status information corresponding to a diagnostic release variable based on the diagnostic release variable list, and diagnose the vehicle engine as a normal operation to allow the vehicle engine to start when the second vehicle status information satisfies a preset diagnostic release condition.

20 Claims, 9 Drawing Sheets

(58) Field of Classification Search
CPC . F02D 2200/101; B60W 50/00; B60W 40/10; G05B 23/02; G01M 15/05
See application file for complete search history.

(56) References Cited

U.S. PATENT DOCUMENTS

| | | | | |
|---|---|---|---|---|
| 8,239,090 | B2 * | 8/2012 | De Lagny | G07C 5/0816 701/29.2 |
| 11,014,581 | B2 * | 5/2021 | Altonji | F02D 29/06 |
| 11,413,966 | B2 | 8/2022 | Jehle et al. | |
| 2021/0061107 | A1 | 3/2021 | Jehle et al. | |

* cited by examiner

APPARATUS AND METHOD FOR PREVENTING MALFUNCTION OF VEHICLE ENGINE

CROSS REFERENCE TO RELATED APPLICATIONS

This application claims priority to and the benefit of Korean Patent Application No. 10-2024-0187743, filed with the Korean Intellectual Property Office on Dec. 16, 2024, the entire contents of which are incorporated herein by reference.

BACKGROUND

(a) Field

The present disclosure relates to a vehicle engine malfunction preventing apparatus and a method therefore, and more specifically, to a technique capable of preventing unintended vehicle starting due to a breakdown.

(b) Description of the Related Art

In general, in a transmission mounted electric device (TMED) structure, which is a parallel hybrid electric vehicle (HEV) type of vehicle, an engine clutch plays a role in connecting a power of an engine and a motor.

Then, for some HEV models that have adopted dual clutch transmission (DCT), a dry clutch system is applied, and a normal close type is applied in which the engine clutch closes (connects the power of the engine and motor) in response to a case where the vehicle power is turned off.

The engine clutch is structured so that when a hydraulic engine clutch actuator (HCA) pushes a piston toward a slave cylinder (CSC), oil filled inside moves to the slave cylinder through a pipe to generate hydraulic pressure, and the generated hydraulic pressure pushes a spring of the clutch to open the engine clutch.

However, such a system may suffer from a hydraulic shortage in a case where a failure, such as a leak, occurs in a path from the hydraulic engine clutch actuator (HCA) to the slave cylinder (CSC).

This lack of hydraulic pressure may cause malfunctions such as unintended engine starting because the engine and the motor are not completely separated in a case where the clutch performs an opening operation.

Furthermore, in a case of an existing engine clutch control system, in response to a case where there is no internal pressure sensor that may determine the hydraulic pressure of the slave cylinder (CSC), it was difficult to determine an engine clutch status due to abnormal engine clutch performance, such as oil leakage.

Accordingly, in the future, there is a need for development of a vehicle engine malfunction preventing apparatus with new logic that can prevent dangerous vehicle situations that may occur due to these system limitations in advance.

SUMMARY

An embodiment of the present disclosure attempts to provide a vehicle engine malfunction preventing apparatus and a method therefore capable of preventing unintended vehicle starting by diagnosing whether a vehicle engine malfunctions according to vehicle status information corresponding to a failure variable and preset diagnostic conditions.

The technical objects of the present disclosure are not limited to the objects mentioned above, and other technical objects not mentioned may be clearly understood by those skilled in the art from the description of the claims.

An embodiment of the present disclosure provides a vehicle engine malfunction preventing apparatus including a memory configured to store a pre-selected failure variable list and a diagnostic release variable list, and a processor configured to diagnose whether a vehicle engine is malfunctioning based on the failure variable list. The processor is configured to obtain first vehicle status information corresponding to a failure variable based on the failure variable list, diagnose the vehicle engine as a malfunction to turn off the vehicle engine in response to a case where the obtained first vehicle status information satisfies a preset diagnostic condition, obtain second vehicle status information corresponding to a diagnostic release variable based on the diagnostic release variable list, and diagnose the vehicle engine as a normal operation to allow the vehicle engine to start in response to a case where the second vehicle status information satisfies a preset diagnostic release condition.

In an embodiment of the present disclosure, the processor may be configured to obtain different first vehicle status information for each failure variable included in the failure variable list in response to obtaining the first vehicle status information.

In an embodiment of the present disclosure, the processor may be configured to match different diagnostic conditions to each acquired first vehicle status information and determine whether the diagnostic condition matched to the first vehicle status information is satisfied in a case of turning off the vehicle engine, and diagnose the vehicle engine as a malfunction to turn off the vehicle engine in response to a case where at least one of the first vehicle status information satisfies the diagnostic condition.

In an embodiment of the present disclosure, the processor may be configured to match a first diagnostic condition for speed synchronization verification, which determines whether a revolutions per minute (RPM) difference between the engine and a motor is less than or equal to a preset RPM difference value in response to a case where the acquired first vehicle status information is engine and motor speed information of a vehicle, with a second diagnostic condition for synchronization diagnostic time verification, which determines whether a diagnostic time is greater than or equal to a preset time, and diagnose the vehicle engine as a malfunction to turn off the vehicle engine in response to a case where both the first and second diagnostic conditions are satisfied.

In an embodiment of the present disclosure, the processor may be configured to match a first diagnostic condition for engine speed verification, which determines whether an engine speed is equal to or greater than a preset engine speed in response to a case where the acquired first vehicle status information is engine speed information, with a second diagnostic condition for synchronization diagnostic time verification, which determines whether a diagnostic time is equal to or greater than a preset time, and diagnose the vehicle engine as a malfunction to turn off the vehicle engine in response to a case where both the first and second diagnostic conditions are satisfied.

In an embodiment of the present disclosure, the processor may be configured to match a first diagnostic condition for engine driving mode verification, which determines whether an engine driving mode is a preset charging mode in response to a case where the acquired first vehicle status information is engine charging mode information, with a second diagnostic condition for synchronization diagnostic time verification, which determines whether a diagnostic time is equal to or greater than a preset time, and diagnose the vehicle engine as a malfunction to turn off the vehicle engine in response to a case where both the first and second diagnostic conditions are satisfied.

In an embodiment of the present disclosure, the processor may be configured to match a first diagnostic condition for initial vehicle speed verification, which determines whether an initial vehicle speed is lower than or equal to a preset vehicle speed in response to a case where the acquired first vehicle status information is wheel speed information, with a second diagnostic condition for synchronization diagnostic time verification, which determines whether a diagnostic time is equal to or greater than a preset time, and diagnose the vehicle engine as a malfunction to turn off the vehicle engine in response to a case where both the first and second diagnostic conditions are satisfied.

In an embodiment of the present disclosure, the processor may be configured to match a first diagnostic condition for transmission status mode verification, which determines whether transmission power is being transmitted in response to a case where the acquired first vehicle status information is transmission status mode information, with a second diagnostic condition for synchronization diagnostic time verification, which determines whether a diagnostic time is equal to or greater than a preset time, and diagnose the vehicle engine as a malfunction to turn off the vehicle engine in response to a case where both the first and second diagnostic conditions are satisfied.

In an embodiment of the present disclosure, the processor may be configured to obtain different second vehicle status information for each diagnostic release variable included in the diagnostic release variable list in response to obtaining the second vehicle status information.

In an embodiment of the present disclosure, the processor may be configured to match different diagnostic release conditions to each acquired second vehicle status information in a case of allowing the vehicle engine to start and determine whether the diagnostic release condition matched to the second vehicle status information is satisfied, and diagnose the vehicle engine as a normal operation to allow the vehicle engine to start in response to a case where at least one of the second vehicle status information satisfies the diagnostic release condition.

Another embodiment of the present disclosure provides a vehicle engine malfunction preventing method including obtaining, by a processor, first vehicle status information corresponding to a failure variable based on a failure variable list, determining, by the processor, whether the acquired first vehicle status information satisfies a preset diagnostic condition, turning off, by the processor, a vehicle engine by diagnosing the vehicle engine as a malfunction in response to a case where the acquired first vehicle status information satisfies a preset diagnostic condition, obtaining, by the processor, second vehicle status information corresponding to a diagnostic release variable based on the diagnostic release variable list, determining, by the processor, whether the second vehicle status information satisfies a preset diagnostic release condition, and allowing, by the processor, the vehicle engine to start by diagnosing the vehicle engine as a normal operation to in response to a case where the second vehicle status information satisfies a preset diagnostic release condition.

According to a present technique, it may be possible to prevent unintended vehicle starting by diagnosing whether a vehicle engine malfunctions according to vehicle status information corresponding to a failure variable and preset diagnostic conditions.

That is, according to the present technique, it may be possible to prevent unintended vehicle acceleration due to engine clutch failure during driving by using this logic.

Furthermore, according to a present technique, it may be possible to prevent situations where a vehicle cannot be driven by distinguishing between diagnostic logic and healing logic and allowing or disallowing engine starting, thereby maintaining safe vehicle driving.

Furthermore, according to a present technique, it may be possible to prevent a risk of acceleration and reduce costs even without a pressure sensor inside an engine clutch system.

Furthermore, various effects which may be directly or indirectly identified through the present specification may be provided.

DETAILED DESCRIPTION

Figure 1:
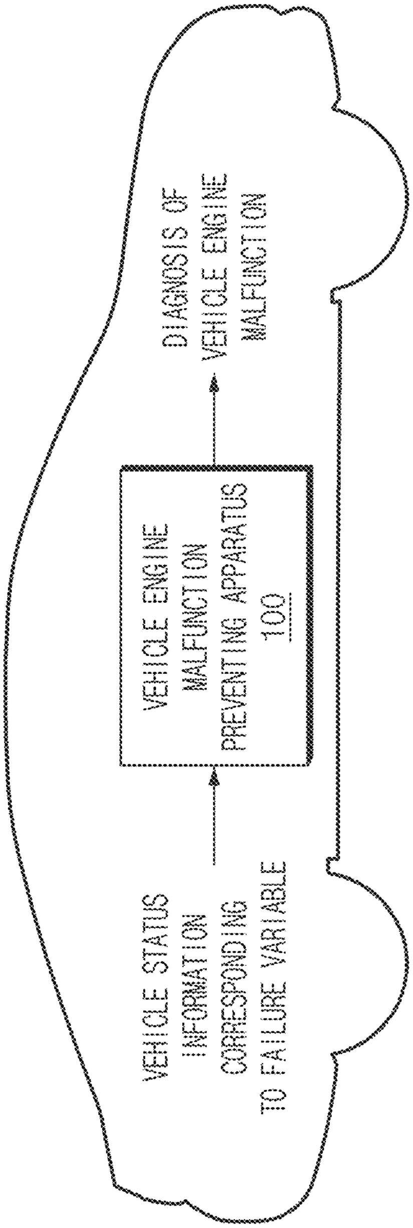
FIG. 1 illustrates a view for describing an example vehicle including a vehicle engine malfunction preventing apparatus.

Hereinafter, some embodiments of the present disclosure will be described in detail with reference to exemplary drawings. It should be noted that in adding reference numerals to constituent elements of each drawing, the same constituent elements include the same reference numerals as possible even though they are indicated on different drawings. In describing an embodiment of the present disclosure, when it is determined that a detailed description of the well-known configuration or function associated with the embodiment of the present disclosure may obscure the gist of the present disclosure, it will be omitted.

In describing constituent elements according to an embodiment of the present disclosure, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which an exemplary embodiment of the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various embodiments of the present disclosure will be described in detail with reference to FIG. 1 to FIG. 8.

FIG. 1 illustrates a view for describing an example vehicle including a vehicle engine malfunction preventing apparatus.

As illustrated in FIG. 1, the vehicle engine malfunction preventing apparatus 100 of the present disclosure may be configured to diagnose whether a vehicle engine malfunctions based on a failure variable list.

The vehicle engine malfunction preventing apparatus may be configured to obtain first vehicle status information corresponding to a failure variable based on the failure variable list, diagnose a vehicle engine as a malfunction to turn off the vehicle engine in response to a case where the obtained first vehicle status information satisfies a preset diagnostic condition, obtain second vehicle status information corresponding to a diagnostic release variable based on a diagnostic release variable list, and diagnose the vehicle engine as a normal operation to allow the vehicle engine to start in response to a case where the second vehicle status information satisfies a preset diagnostic release condition.

For example, the failure variable list may include a first failure variable for speed synchronization verification, a second failure variable for engine speed verification, a third failure variable for engine drive mode verification, a fourth failure variable for initial vehicle speed verification, a fifth failure variable for transmission status mode verification, and a sixth failure variable for synchronization diagnostic time verification.

Furthermore, the diagnostic release variable list may include a first diagnostic release variable for speed synchronization verification, a second diagnostic release variable for motor speed verification, a third diagnostic release variable for engine drive mode verification, and a fourth diagnostic release variable for diagnostic time verification.

The vehicle engine malfunction preventing apparatus 100 may be configured to obtain different first vehicle status information for each failure variable included in the failure variable list in response to obtaining the first vehicle status information.

Furthermore, in a case of turning off the vehicle engine, the vehicle engine malfunction preventing apparatus 100 may be configured to match different diagnostic conditions to each acquired first vehicle status information and determine whether the diagnostic condition matched to the first vehicle status information is satisfied, and diagnose the vehicle engine as a malfunction to turn off the vehicle engine in response to a case where at least one of the first vehicle status information satisfies the diagnostic condition.

Furthermore, the vehicle engine malfunction preventing apparatus 100 may be configured to obtain different second vehicle status information for each diagnostic release variable included in the diagnostic release variable list in response to obtaining the second vehicle status information.

Furthermore, when allowing the vehicle engine to start, the vehicle engine malfunction preventing apparatus 100 may be configured to match different diagnostic release conditions to each acquired second vehicle status information and determine whether the diagnostic release condition matched to the second vehicle status information is satisfied, and diagnose the vehicle engine as a normal operation to allow the vehicle engine to start in response to a case where at least one of the second vehicle status information satisfies the diagnostic release condition.

Herein, the vehicle engine malfunction preventing apparatus 100 may be configured to diagnose the vehicle engine as a malfunction to turn off the vehicle engine in response to a case where at least one of the second vehicle status information does not satisfy the diagnostic release conditions.

Figure 2:
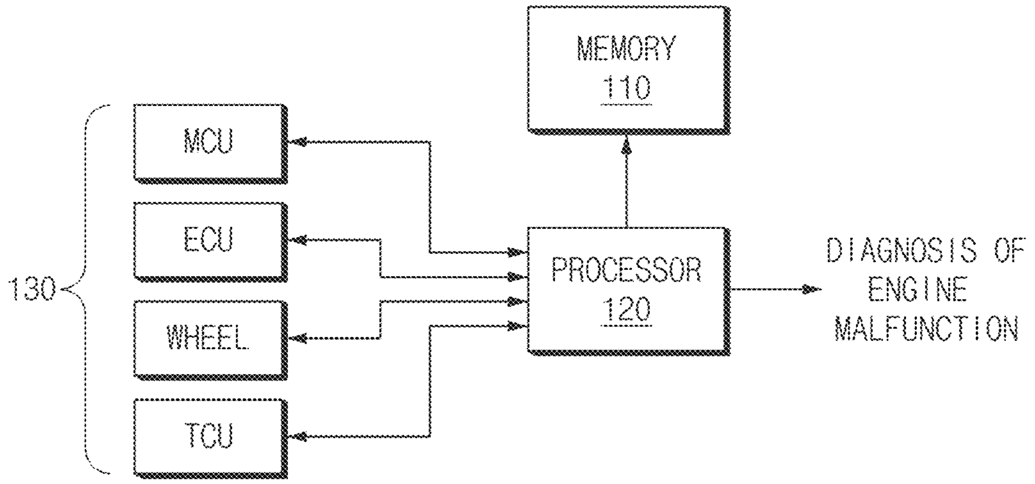
FIG. 2 illustrates a block diagram showing an example configuration of a vehicle engine malfunction preventing apparatus.

FIG. 2 illustrates a block diagram showing an example configuration of a vehicle engine malfunction preventing apparatus.

As illustrated in FIG. 2, the vehicle engine malfunction preventing apparatus of the present disclosure may be configured to include a memory 110 that stores a pre-selected failure variable list and a diagnostic release variable list, and a processor 120 that diagnoses whether the vehicle engine malfunctions based on the failure variable list.

Herein, the processor 120 may be configured to obtain first vehicle status information corresponding to a failure variable based on the failure variable list from a vehicle control apparatus 130, diagnose the vehicle engine as a malfunction to turn off the vehicle engine in response to a case where the obtained first vehicle status information satisfies a preset diagnostic condition, obtain second vehicle status information corresponding to a diagnostic release variable based on a diagnostic release variable list from the vehicle control apparatus 130, and diagnose the vehicle engine as a normal operation to allow the vehicle engine to start in response to a case where the second vehicle status information satisfies a preset diagnostic release condition.

For example, the failure variable list may include a first failure variable for speed synchronization verification, a second failure variable for engine speed verification, a third failure variable for engine drive mode verification, a fourth failure variable for initial vehicle speed verification, a fifth failure variable for transmission status mode verification, and a sixth failure variable for synchronization diagnostic time verification, but this is merely an embodiment, and the present disclosure is not limited thereto.

Furthermore, the diagnostic release variable list may include a first diagnostic release variable for speed synchronization verification, a second diagnostic release variable for motor speed verification, a third diagnostic release variable for engine drive mode verification, and a fourth diagnostic release variable for diagnostic time verification, but this is merely an embodiment, and the present disclosure is not limited thereto.

Then, the processor 120 may be configured to obtain different first vehicle status information for each failure variable included in the failure variable list in response to obtaining the first vehicle status information.

For example, when a failure variable included in the fault variable list is the speed synchronization verification, the processor 120 may be configured to obtain first vehicle status information including engine and motor speed information of the vehicle from a micro controller unit (MCU) among vehicle control apparatuses 130.

As another embodiment, the processor 120 may be configured to obtain first vehicle status information including engine speed information from an electronic control unit (ECU) among the vehicle control apparatuses 130 in response to a case where the failure variable included in the failure variable list is the engine speed verification.

In another embodiment, the processor 120 may be configured to obtain first vehicle status information including engine charging mode information from the electronic control unit (ECU) among the vehicle control apparatuses 130 in response to a case where the failure variable included in the failure variable list is the engine driving mode verification.

In another embodiment, the processor 120 may be configured to obtain first vehicle status information including wheel speed information from wheels of the vehicle in response to a case where the failure variable included in the fault variable list is the initial vehicle speed verification.

In another embodiment, the processor 120 may be configured to obtain first vehicle status information including transmission status mode information from the transmission control unit (TCU) among the vehicle control apparatuses 130 in response to a case where the failure variable included in the failure variable list is the transmission status mode verification.

Then, when turning off the vehicle engine, the processor 120 may be configured to match different diagnostic conditions to each acquired first vehicle status information and determine whether the diagnostic condition matched to the first vehicle status information is satisfied, and diagnose the vehicle engine as a malfunction to turn off the vehicle engine in response to a case where at least one of the first vehicle status information satisfies the diagnostic condition.

Herein, the processor 120 may be configured to match a first diagnostic condition for speed synchronization verification, which determines whether a revolutions per minute (RPM) difference between the engine and the motor is less than or equal to a preset RPM difference value in response to a case where the acquired first vehicle status information is engine and motor speed information of the vehicle, with a second diagnostic condition for synchronization diagnostic time verification, which determines whether a diagnostic time is greater than or equal to a preset time, and diagnose the vehicle engine as a malfunction to turn off the vehicle engine in response to a case where both the first and second diagnostic conditions are satisfied.

For example, the processor 120 may be configured to determine that the first diagnostic condition for speed synchronization verification is satisfied in a case where the RPM difference between the engine and the motor is about 120 RPM or less, and the second diagnostic condition for synchronization diagnostic time verification is satisfied in response to a case where the diagnostic time is about 400 ms (milliseconds) or more.

In some cases, the processor 120 may be configured to match a first diagnostic condition for engine speed verification, which determines whether the engine speed is equal to or greater than a preset engine speed in response to a case where the acquired first vehicle status information is the engine speed information, with a second diagnostic condition for synchronization diagnostic time verification, which determines whether the diagnostic time is equal to or greater than a preset time, and diagnose the vehicle engine as a malfunction to turn off the vehicle engine in response to a case where both the first and second diagnostic conditions are satisfied.

For example, the processor 120 may be configured to determine that the first diagnostic condition for engine speed verification is satisfied in response to a case where the engine speed is about 500 RPM or more, and determine that the second diagnostic condition for synchronization diagnostic time verification is satisfied in response to a case where the diagnostic time is about 400 ms or more.

In another case, the processor 120 may be configured to match a first diagnostic condition for engine driving mode verification, which determines whether the engine driving mode is a preset charging mode in response to a case where the acquired first vehicle status information is the engine charging mode information, with a second diagnostic condition for synchronization diagnostic time verification, which determines whether the diagnostic time is equal to or greater than a preset time, and diagnose the vehicle engine as a malfunction to turn off the vehicle engine in response to a case where both the first and second diagnostic conditions are satisfied.

For example, the processor 120 may be configured to determine that the first diagnostic condition for the engine driving mode is satisfied in response to a case where the engine driving mode is an idle charging mode or a partload charging mode, and determine that the second diagnostic condition for synchronization diagnostic time verification is satisfied in response to a case where the diagnostic time is about 400 ms or more.

In some cases, the processor 120 may be configured to match a first diagnostic condition for initial vehicle speed verification, which determines whether the initial vehicle speed is lower than or equal to a preset vehicle speed in response to a case where the acquired first vehicle status information is the wheel speed information, with a second diagnostic condition for synchronization diagnostic time verification, which determines whether the diagnostic time is equal to or greater than a preset time, and diagnose the vehicle engine as a malfunction to turn off the vehicle engine in response to a case where both the first and second diagnostic conditions are satisfied.

For example, the processor 120 may be configured to determine that the first diagnostic condition for initial vehicle speed verification is satisfied in response to a case where the initial vehicle speed is about 4 kph or less, and determine that the second diagnostic condition for synchronization diagnostic time verification is satisfied in response to a case where the diagnostic time is about 400 ms or more.

In another case, the processor 120 may be configured to match a first diagnostic condition for transmission status mode verification, which determines whether transmission power is being transmitted in response to a case where the acquired first vehicle status information is the transmission status mode information, with a second diagnostic condition for synchronization diagnostic time verification, which determines whether the diagnostic time is equal to or greater than a preset time, and diagnose the vehicle engine as a malfunction to turn off the vehicle engine in response to a case where both the first and second diagnostic conditions are satisfied.

For example, the processor 120 may be configured to not perform a malfunction diagnosis of a vehicle if the transmission power is in an open status or a disengage status.

If the transmission power is being transmitted, the processor 120 may be configured to determine that the first diagnostic condition for the transmission status mode verification is satisfied and determine that the second diagnostic condition for synchronization diagnostic time verification is satisfied in response to a case where the diagnostic time is about 400 ms or more Next, the processor 120 may be configured to obtain different second vehicle status information for each diagnostic release variable included in the diagnostic release variable list in response to obtaining the second vehicle status information.

For example, in a case where a diagnostic release variable included in the diagnostic release variable list is the speed synchronization verification, the processor 120 may be configured to obtain second vehicle status information including engine and motor speed information of the vehicle from the micro controller unit (MCU).

In another embodiment, the processor 120 may be configured to obtain second vehicle status information including motor speed information from the electronic control unit (ECU) in response to a case where a diagnostic release variable included in the diagnostic release variable list is the motor speed verification.

In another embodiment, the processor 120 may be configured to obtain second vehicle status information including engine driving mode information from the electronic control unit (ECU) in response to a case where a diagnostic release variable included in the diagnostic release variable list is the engine driving mode verification.

Then, in a case of allowing the vehicle engine to start, the processor 120 may be configured to match different diagnostic release conditions to each acquired second vehicle status information and determine whether the diagnostic release condition matched to the second vehicle status information is satisfied, and diagnose the vehicle engine as a normal operation to allow the vehicle engine to start in response to a case where at least one of the second vehicle status information satisfies the diagnostic release condition.

Herein, the processor 120 may be configured to match a first diagnostic release recondition for speed asynchronization verification, which determines whether a revolutions per minute (RPM) difference between the engine and the motor is greater than or equal to a preset RPM difference value in response to a case where the acquired second vehicle status information is engine and motor speed information of the vehicle, with a second diagnostic release condition for asynchronization diagnostic time verification, which determines whether a diagnostic time is greater than or equal to a preset time, and diagnose the vehicle engine as a normal operation to allow the vehicle engine to start in response to a case where both the first and second diagnostic release conditions are satisfied.

For example, the processor 120 may be configured to determine that the first diagnostic release condition for speed asynchronization verification is satisfied in response to a case where the RPM difference between the engine and the motor is about 400 RPM or more, and determine that the second diagnostic release condition for asynchronization diagnostic time verification is satisfied in response to a case where the diagnostic time is about 2 seconds or more.

In some cases, the processor 120 may be configured to match a first diagnostic release condition for motor speed verification, which determines whether the motor speed is equal to or greater than a preset motor speed in response to a case where the acquired second vehicle status information is the motor speed information, with a second diagnostic release condition for asynchronization diagnostic time verification, which determines whether the diagnostic time is equal to or greater than a preset time, and diagnose the vehicle engine as a normal operation to allow the vehicle engine to start in response to a case where both the first and second diagnostic release conditions are satisfied.

For example, the processor 120 may be configured to determine that the first diagnostic release condition for motor speed verification is satisfied in response to a case where the motor speed is about 600 RPM or more, and determine that the second diagnostic release condition for asynchronization diagnostic time verification is satisfied in response to a case where the diagnostic time is about 2 s or more.

In another case, the processor 120 may be configured to match a first diagnostic release condition for engine driving mode verification, which determines whether the engine driving mode is a preset EV driving mode in response to a case where the acquired second vehicle status information is the engine driving mode information, with a second diagnostic release condition for asynchronization diagnostic time verification, which determines whether the diagnostic time is equal to or greater than a preset time, and diagnose the vehicle engine as a normal operation to allow the vehicle engine to start in response to a case where both the first and second diagnostic release conditions are satisfied.

For example, the processor 120 may be configured to determine that the first diagnostic release condition for engine driving mode verification is satisfied in response to a case where the engine driving mode is an engine stop (EngStop) mode, and determine that the second diagnostic release condition for asynchronization diagnostic time verification is satisfied in response to a case where the diagnostic time is about 2 s or more.

Then, the processor 120 may be configured to diagnose the vehicle engine as a malfunction to turn off the vehicle engine in response to a case where at least one of the second vehicle status information does not satisfy the diagnostic release conditions.

In this way, the present technique may be a technique that aims to prevent unintended acceleration caused by engine clutch closing differently from an actual open command due to internal leakage or other reasons even though the actual open command is issued.

In other words, this technique is necessary for vehicle system unit diagnosis and establishment of a departure countermeasure strategy, as undetected driving conditions may occur due to limitations in a diagnostic method, such as HCA unit leakage.

When considering a most dangerous part in terms of vehicle functional safety, it is a case where the vehicle starts unintentionally in response to a case where the engine is started with the brake off while stopped in an EV driving mode.

This risk may be particularly high on roads with a lot of pedestrian traffic, such as parking lots or in front of crosswalks, several diagnostic variables were selected in this technique.

For example, this technology may select six failure variables.

A first failure variable may be a failure variable for speed synchronization verification to check whether an engine clutch is engaged by comparing engine and motor speeds, a second failure variable may be a failure variable for engine speed verification to check whether an engine has started, a third failure variable may be a failure variable for engine driving mode verification to check an idle charging mode or a PartLoad charging mode without driver demanding torque, a fourth failure variable may be a fault variable for initial vehicle speed verification because a risk of unintended starting (occurrence of a largest acceleration G value) is the greatest when the vehicle is started from a stop status, a fifth failure variable may be a failure variable for transmission status mode verification to check determination of a power non-transmission status, and a sixth failure variable may be a failure variable for synchronization diagnosis time verification to check diagnostic consistency by measuring a speed synchronization time.

Herein, detailed variable conditions of this technique will be described as follows.

The first failure variable may be a failure variable for speed synchronization verification that compares the engine and motor speeds to check whether the engine clutch is engaged, and it may be necessary to select a condition for minimizing misdiagnosis based on maximum vehicle acceleration reference.

Accordingly, for the first failure variable, a misdiagnosis rate may increase as a difference ΔRPM between the motor and the engine increases, so considering diagnosis of a sudden acceleration level and reduction of misdiagnosis due to synchronization of the motor and engine, a certain reference (e.g., difference ΔRPM of approximately 120 or less between the motor and the engine) may be selected.

Then, the second failure variable may be a failure variable for checking the engine speed to determine whether the engine has started, so as to determine whether the engine is running.

Herein, in order to avoid misdiagnosis in a case of non-power output of a hybrid starter and generator (HSG) that starts the engine or abnormal engine operation, a diagnosis condition may be entered in response to a case where a certain reference speed (e.g., approximately 500 RPM) is exceeded, and diagnosis may be prohibited in response to a case where the engine speed is below a certain reference (e.g., approximately 450 RPM).

Next, the third failure variable may be a failure variable for engine driving mode verification that checks an idle charging mode or a PartLoad charging mode without driver demanding torque, and may be determined by being limited to the starting mode that is necessary in the system without the driver demanding torque (e.g., engine starting that requires SOC or air conditioning, etc.), so it may possible to distinguish the engine driving mode that does not require a driver to move the vehicle, and thus it may be selected to perform diagnosis in a corresponding engine state (e.g., idle charging mode or PartLoad charging mode).

Next, the fourth failure variable may be a failure variable for initial vehicle speed verification because a risk of unintended vehicle acceleration (occurrence of a largest acceleration G value) is the greatest in response to a case where the vehicle is started from a stationary state, and a reason for checking the vehicle speed is to limit a condition in which the vehicle is started.

While the vehicle is driving, there are frequent cases where the motor speed and engine speed are similar, and an acceleration value is the largest in response to a case where the vehicle starts from the stationary state, so this may be a most dangerous case as an unintended starting situation may occur.

To reduce misdiagnosis while driving and limit a time at which a gap between a normal engine speed and a motor speed is maximized, a vehicle speed may be set to a certain reference (e.g., approximately 4 KPH) in a low RPM range such that diagnosis may be performed below a certain speed reference.

Then, the fifth failure variable may be a failure variable for transmission status mode verification that checks a power non-transmission status, and may be selected to perform diagnosis in a DCT power transmission status to further reduce a risk of misdiagnosis.

Next, the sixth failure variable may be a failure variable for synchronization diagnosis time verification that measures a speed synchronization time to check diagnostic consistency, and it may be necessary to select a time to minimize vehicle acceleration, a certain time (e.g., a continuous condition of approximately 400 ms) may be selected through vehicle evaluation.

In this way, according to the present technique, it may immediately turn off the engine in response to a case where it is determined to be an unintended acceleration due to the above six conditions.

Furthermore, according to the present technique, it may also be possible to perform a diagnostic release reaction in following situations.

That is, according to the present technique, it may be possible to prevent drivability degradation by determining that, contrary to the diagnosis, there is no longer any synchronization abnormality between the motor and the engine in response to a case where a specific situation occurs, and by clearing the diagnosis and allowing the engine to start to go into HEV mode.

A first diagnostic release variable may be a diagnostic release variable for speed synchronization verification that may check whether the engine and the motor are synchronized immediately after the engine is turned off in response to transitioning to EV driving by diagnosis.

For example, in a case where the RPM difference between the engine and the motor is approximately 400 RPM or more, it may be determined that the diagnostic release condition for speed asynchronization verification is satisfied.

Then, a second diagnostic release variable may be a diagnostic release variable for motor speed verification that may prevent diagnosis and determine whether there is accurate asynchrony.

For example, in a case where the motor speed is approximately 600 RPM or more, it may be determined that the diagnostic release condition for motor speed verification is satisfied, and in a case where the motor speed is approximately 500 RPM or less, asynchronous diagnosis may be omitted.

Next, a second diagnostic release variable may be a diagnostic release variable for engine driving mode verification, and may determine the EV driving mode.

For example, in a case where the engine driving mode is the engine stop (EngStop) mode, it may be determined that the diagnostic release condition for the engine driving mode verification is satisfied.

Next, a fourth diagnostic release variable may be a diagnostic release variable for diagnosis time verification that may minimize healing determination and determine transition to the HEV driving mode to prevent drivability degradation in a case of misdiagnosis.

For example, in a case where the diagnosis time is 2 s or more, it may be determined that the diagnostic release condition for the asynchronous diagnosis time verification is satisfied.

As such, according to a present technique, it may be possible to prevent unintended vehicle starting by diagnosing whether a vehicle engine malfunctions according to vehicle status information corresponding to a failure variable and preset diagnostic conditions.

That is, according to the present technique, it may be possible to prevent unintended vehicle acceleration due to engine clutch failure during driving by using this logic.

Furthermore, according to a present technique, it may be possible to prevent situations where a vehicle cannot be driven by distinguishing between diagnostic logic and healing logic and allowing or disallowing engine starting, thereby maintaining safe vehicle driving.

Furthermore, according to a present technique, it may be possible to prevent a risk of acceleration and reduce costs even without a pressure sensor inside an engine clutch system.

Figure 3:
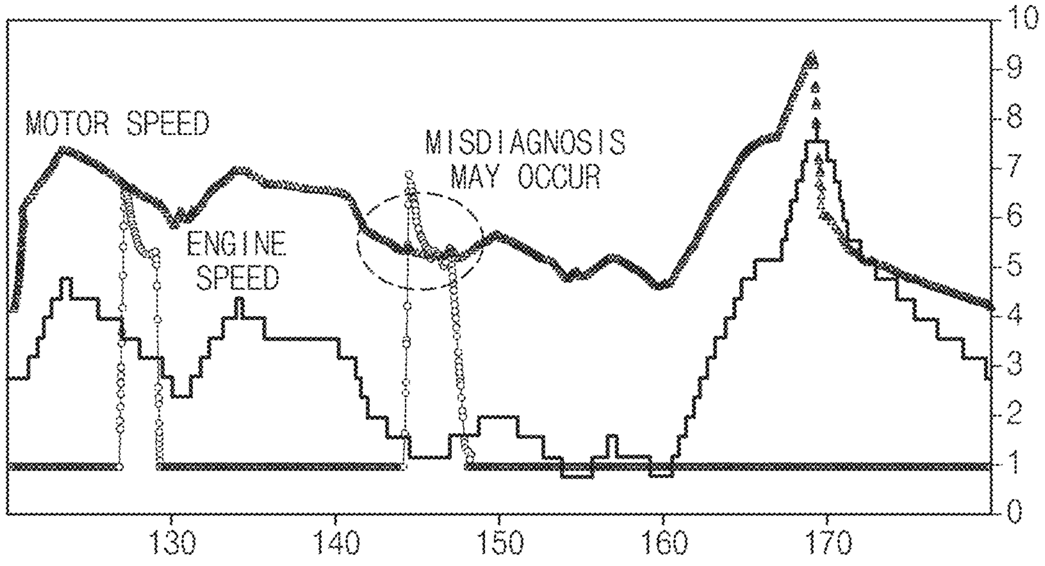
FIG. 3 illustrates a view for describing an example failure variable for initial vehicle speed verification.

FIG. 3 illustrates a view for describing an example failure variable for initial vehicle speed verification.

The vehicle engine malfunction preventing apparatus of the present disclosure may be configured to diagnose whether a vehicle engine malfunctions based on a failure variable list.

The failure variable list may include a first failure variable for speed synchronization verification, a second failure variable for engine speed verification, a third failure variable for engine drive mode verification, a fourth failure variable for initial vehicle speed verification, and a fifth failure variable for transmission status mode verification a sixth failure variable for synchronization diagnostic time verification.

As shown in FIG. 3, a risk of unintended acceleration (occurrence of a largest acceleration G value) is the greatest in response to a case where the vehicle is started from the stationary state, so among the failure variables, the failure variable for the initial vehicle speed verification may be important.

In the present disclosure, a reason for checking the vehicle speed is to limit it to a condition under which the vehicle starts.

As shown in FIG. 3, it may be seen that there are frequent cases where the motor speed and the engine speed are driven similarly while the vehicle is driving.

The acceleration value is the greatest in a case where the vehicle starts from the stationary state, so this may be a most dangerous case as an unintended starting situation may occur.

Accordingly, in the present disclosure, misdiagnosis during driving may be reduced, and diagnosis may be performed at a certain speed or lower, limited to a point where a gap between the normal engine speed and the motor speed is maximized.

For example, in the present disclosure, as a failure variable for initial vehicle speed verification, a low RPM range where an initial vehicle speed is about 4 KPH or less may be selected.

Figure 4:
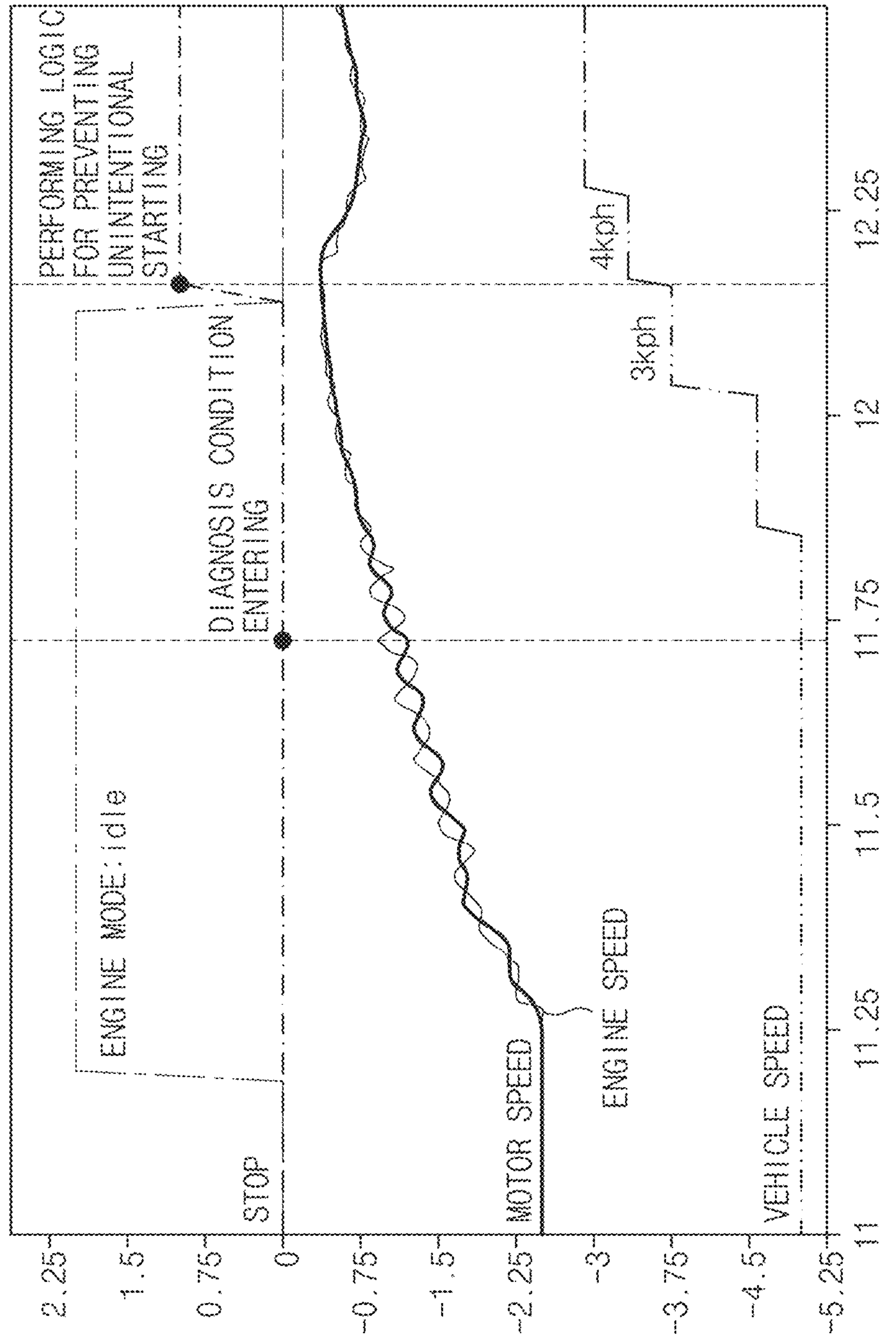
FIG. 4 and FIG. 5 illustrate graphs for describing an example operation evaluation result of a vehicle engine malfunction preventing apparatus.
Figure 5:
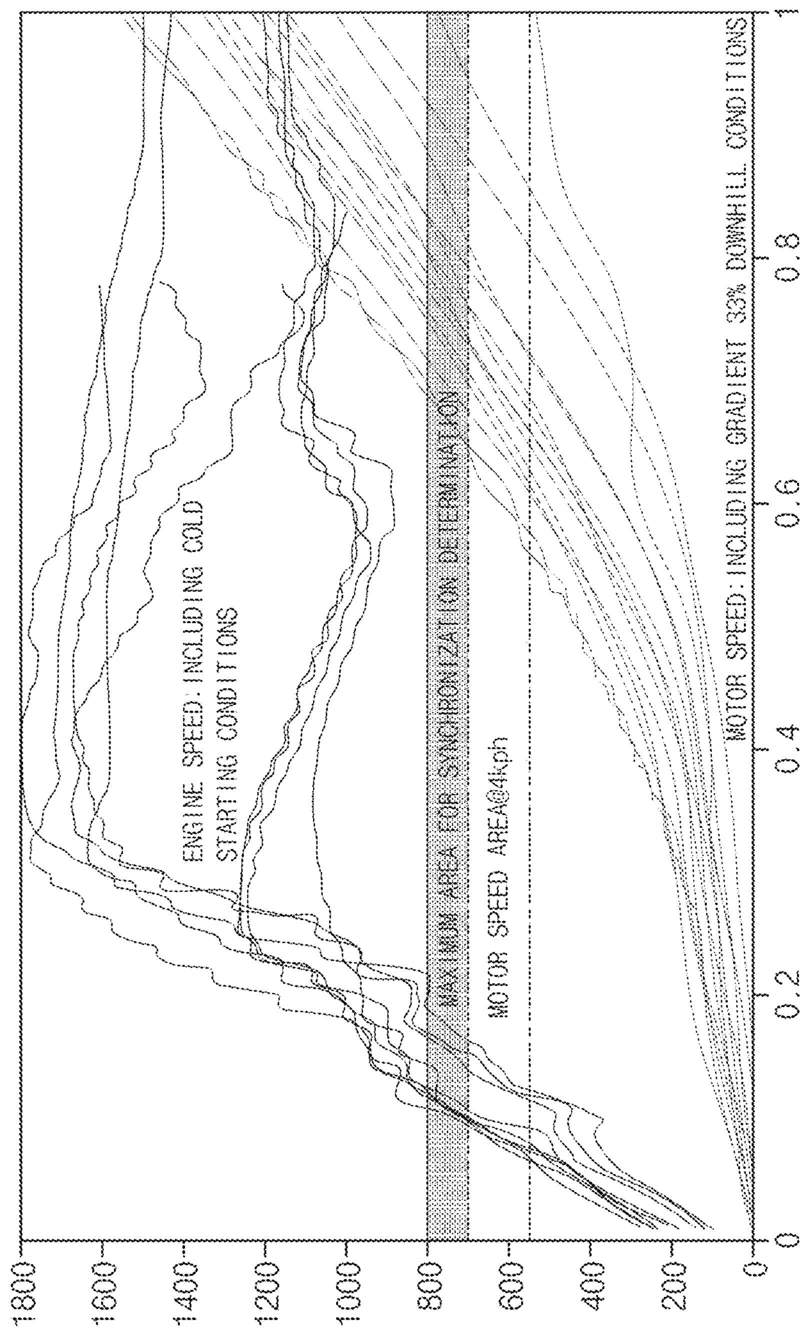

FIG. 4 and FIG. 5 illustrate graphs for describing an example operation evaluation result of a vehicle engine malfunction preventing apparatus.

As illustrated in FIG. 4, the vehicle engine malfunction preventing apparatus of the present disclosure may accurately detect an unintended vehicle start situation as the logic is executed.

As illustrated in FIG. 4, even when the clutch is determined to be open due to an actual engine clutch abnormality, and the clutch is actually closed and the vehicle starts unintentionally due to the engine starting, the logic of the present technique may accurately detect the unintentional starting situation of the vehicle and perform a corresponding engine start-off to block the unintentional starting situation.

Furthermore, FIG. 5 illustrates data comparing an engine starting RPM in a normal vehicle state and a motor speed at maximum vehicle acceleration with the engine clutch open.

As illustrated in FIG. 5, the vehicle engine malfunction preventing apparatus of the present disclosure may check that, in a case where the logic is performed, in a normal state where the engine clutch is in a normal open state, there is almost no probability that the engine and motor speeds will be synchronized for a certain period of time in a maximum synchronization determination range.

Accordingly, according to the present technique, it may be possible to prevent unintended vehicle acceleration due to engine clutch failure during driving by using diagnostic and healing logic.

Furthermore, according to a present technique, it may be possible to prevent situations where a vehicle cannot be driven by distinguishing between diagnostic logic and healing logic and allowing or disallowing engine starting, thereby maintaining safe vehicle driving.

Furthermore, according to a present technique, it may be possible to prevent a risk of acceleration and reduce costs even without a pressure sensor inside an engine clutch system.

Figure 6:
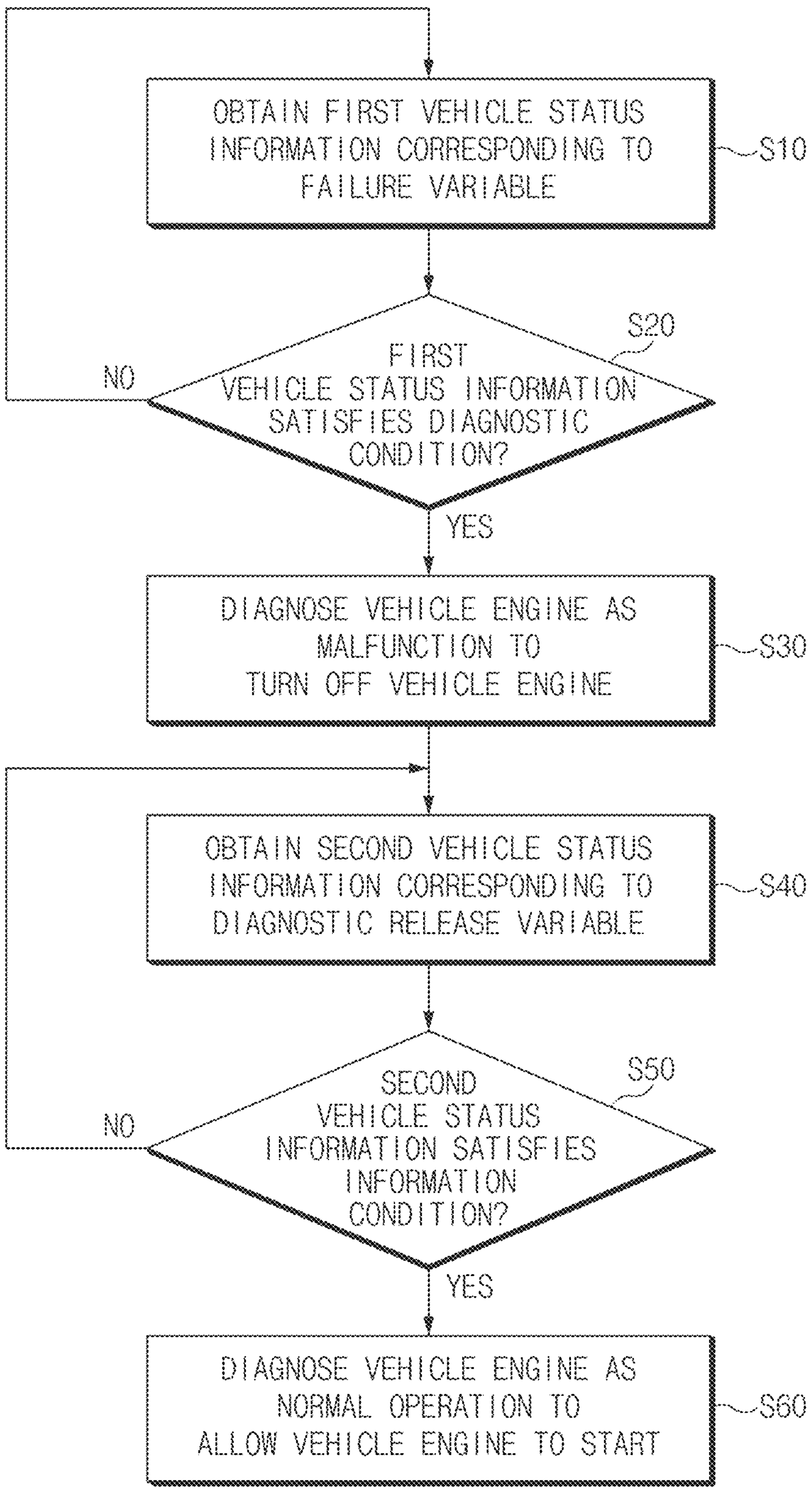
FIG. 6 and FIGS. 7A and 7B illustrate flowcharts for describing an example vehicle engine malfunction preventing method for a vehicle engine malfunction preventing apparatus.

FIG. 6 and FIG. 7 illustrate flowcharts for describing an example vehicle engine malfunction preventing method for a vehicle engine malfunction preventing apparatus.

As illustrated in FIG. 6, according to the present disclosure may obtain first vehicle status information corresponding to a failure variable based on a failure variable list (S10).

Herein, according to the present disclosure, it may be possible to obtain different first vehicle status information for each failure variable included in the failure variable list.

For example, according to the present disclosure, in a case where the failure variable included in the failure variable list is speed synchronization verification, the first vehicle status information including engine and motor speed information of the vehicle may be obtained from a micro controller unit (MCU), in a case where the failure variable included in the failure variable list is engine speed verification, the first vehicle status information including engine speed information may be obtained from an electronic control unit (ECU), in a case where the failure variable included in the failure variable list is engine driving mode verification, the first vehicle status information including engine charging mode information may be obtained from the electronic control unit (ECU), in a case where the failure variable included in the failure variable list is initial vehicle speed verification, the first vehicle status information including wheel speed information may be obtained from the wheels of the vehicle, and in a case where the failure variable included in the failure variable list is transmission status mode verification, the first vehicle status information including transmission status mode information may be obtained from the transmission control unit (TCU).

Then, according to the present disclosure, it may be possible to determine whether the acquired first vehicle status information satisfies a preset diagnostic condition (S20).

Herein, according to the present disclosure, it may be possible to match different diagnostic conditions to each acquired first vehicle status information, and determine whether the diagnostic conditions matched to each first vehicle status information are satisfied.

Next, according to the present disclosure, it may be possible to diagnose the vehicle engine as a malfunction to turn off the vehicle engine in response to a case where the acquired first vehicle status information satisfies a preset diagnostic condition (S30).

Herein, according to the present disclosure, it may be possible to match a first diagnostic condition for speed synchronization verification, which determines whether a revolutions per minute (RPM) difference between the engine and the motor is less than or equal to a preset RPM difference value in response to a case where the acquired first vehicle status information is engine and motor speed information of the vehicle, with a second diagnostic condition for synchronization diagnostic time verification, which determines whether a diagnostic time is greater than or equal to a preset time, and diagnose the vehicle engine as a malfunction to turn off the vehicle engine in response to a case where both the first and second diagnostic conditions are satisfied.

In some cases, according to the present disclosure, it may be possible to match a first diagnostic condition for engine speed verification, which determines whether the engine speed is equal to or greater than a preset engine speed in response to a case where the acquired first vehicle status information is the engine speed information, with a second diagnostic condition for synchronization diagnostic time verification, which determines whether the diagnostic time is equal to or greater than a preset time, and diagnose the vehicle engine as a malfunction to turn off the vehicle engine in response to a case where both the first and second diagnostic conditions are satisfied.

In another case, according to the present disclosure, it may be possible to match a first diagnostic condition for engine driving mode verification, which determines whether the engine driving mode is a preset charging mode in response to a case where the acquired first vehicle status information is the engine charging mode information, with a second diagnostic condition for synchronization diagnostic time verification, which determines whether the diagnostic time is equal to or greater than a preset time, and diagnose the vehicle engine as a malfunction to turn off the vehicle engine in response to a case where both the first and second diagnostic conditions are satisfied.

In some cases, according to the present disclosure, it may be possible to match a first diagnostic condition for initial vehicle speed verification, which determines whether the initial vehicle speed is lower than or equal to a preset vehicle speed in response to a case where the acquired first vehicle status information is the wheel speed information, with a second diagnostic condition for synchronization diagnostic time verification, which determines whether the diagnostic time is equal to or greater than a preset time, and diagnose the vehicle engine as a malfunction to turn off the vehicle engine in response to a case where both the first and second diagnostic conditions are satisfied.

In another case, according to the present disclosure, it may be possible to match a first diagnostic condition for transmission status mode verification, which determines whether transmission power is being transmitted in response to a case where the acquired first vehicle status information is the transmission status mode information, with a second diagnostic condition for synchronization diagnostic time verification, which determines whether the diagnostic time is equal to or greater than a preset time, and diagnose the vehicle engine as a malfunction to turn off the vehicle engine in response to a case where both the first and second diagnostic conditions are satisfied.

Next, according to the present disclosure, it may be possible to obtain second vehicle status information corresponding to a diagnostic release variable based on the diagnostic release variable list (S40).

For example, according to the present disclosure, when a diagnostic release variable included in the diagnostic release variable list is the speed synchronization verification, it may be possible to obtain second vehicle status information including engine and motor speed information of the vehicle from the micro controller unit (MCU).

As another embodiment of the present disclosure, it may be possible to obtain second vehicle status information including motor speed information from the electronic control unit (ECU) in response to a case where a diagnostic release variable included in the diagnostic release variable list is the motor speed verification.

As another embodiment of the present disclosure, it may be possible to obtain second vehicle status information including engine driving mode information from the electronic control unit (ECU) in response to a case where a diagnostic release variable included in the diagnostic release variable list is the engine driving mode verification.

Then, according to the present disclosure, it may be possible to determine whether the second vehicle status information satisfies a preset diagnostic release condition (S50).

Herein, according to the present disclosure, it may be possible to match different diagnostic release conditions to each acquired second vehicle status information, and determine whether the diagnostic release conditions matched to each second vehicle status information are satisfied.

Next, according to the present disclosure, it may be possible to diagnose the vehicle engine as a normal operation to allow the vehicle engine to start in response to a case where the second vehicle status information satisfies a preset diagnostic release condition (S60).

Herein, according to the present disclosure, it may be possible to match a first diagnostic release recondition for speed asynchronization verification, which determines whether a revolutions per minute (RPM) difference between the engine and the motor is greater than or equal to a preset RPM difference value in response to a case where the acquired second vehicle status information is engine and motor speed information of the vehicle, with a second diagnostic release condition for asynchronization diagnostic time verification, which determines whether a diagnostic time is greater than or equal to a preset time, and diagnose the vehicle engine as a normal operation to allow the vehicle engine to start in response to a case where both the first and second diagnostic release conditions are satisfied.

In some cases, according to the present disclosure, it may be possible to match a first diagnostic release condition for motor speed verification, which determines whether the motor speed is equal to or greater than a preset motor speed in response to a case where the acquired second vehicle status information is the motor speed information, with a second diagnostic release condition for asynchronization diagnostic time verification, which determines whether the diagnostic time is equal to or greater than a preset time, and in response to a case where both the first and second diagnostic release conditions are satisfied, and diagnose the vehicle engine as a normal operation to allow the vehicle engine to start in response to a case where both the first and second diagnostic release conditions are satisfied.

In another case, according to the present disclosure, it may be possible to match a first diagnostic release condition for engine driving mode verification, which determines whether the engine driving mode is a preset EV driving mode in response to a case where the acquired second vehicle status information is the engine driving mode information, with a second diagnostic release condition for asynchronization diagnostic time verification, which determines whether the diagnostic time is equal to or greater than a preset time, and diagnose the vehicle engine as a normal operation to allow the vehicle engine to start in response to a case where both the first and second diagnostic release conditions are satisfied.

Then, according to the present disclosure, it may be possible to diagnose the vehicle engine as a malfunction to turn off the vehicle engine in response to a case where at least one of the second vehicle status information does not satisfy the diagnostic release conditions.

As such, according to a present technique, it may be possible to prevent unintended vehicle starting by diagnosing whether a vehicle engine malfunctions according to vehicle status information corresponding to a failure variable and preset diagnostic conditions.

That is, according to the present technique, it may be possible to prevent unintended vehicle acceleration due to engine clutch failure during driving by using this logic.

Furthermore, according to a present technique, it may be possible to prevent situations where a vehicle cannot be driven by distinguishing between diagnostic logic and healing logic and allowing or disallowing engine starting, thereby maintaining safe vehicle driving.

Furthermore, according to a present technique, it may be possible to prevent a risk of acceleration and reduce costs even without a pressure sensor inside an engine clutch system.

Figure 7A:
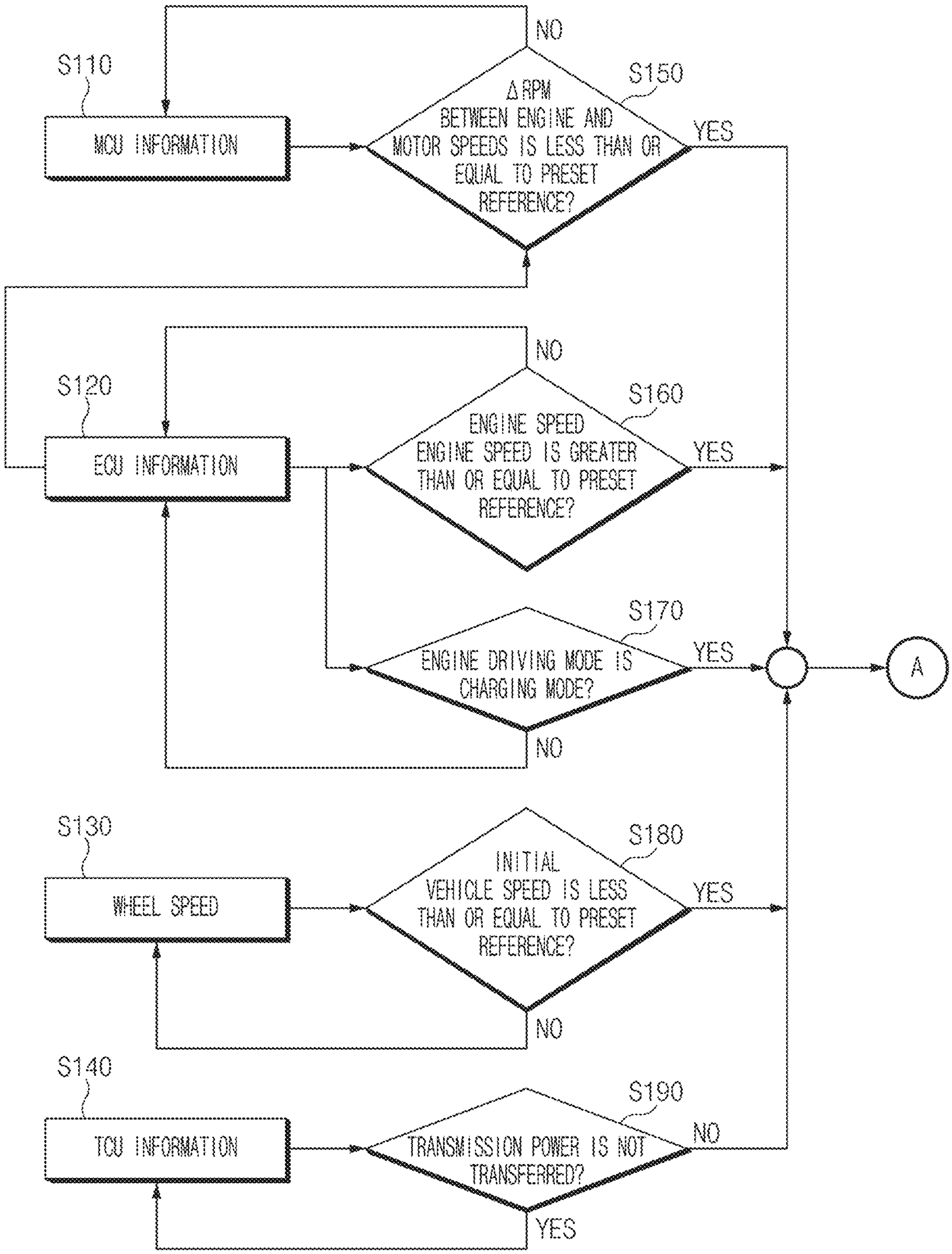
Figure 7B:
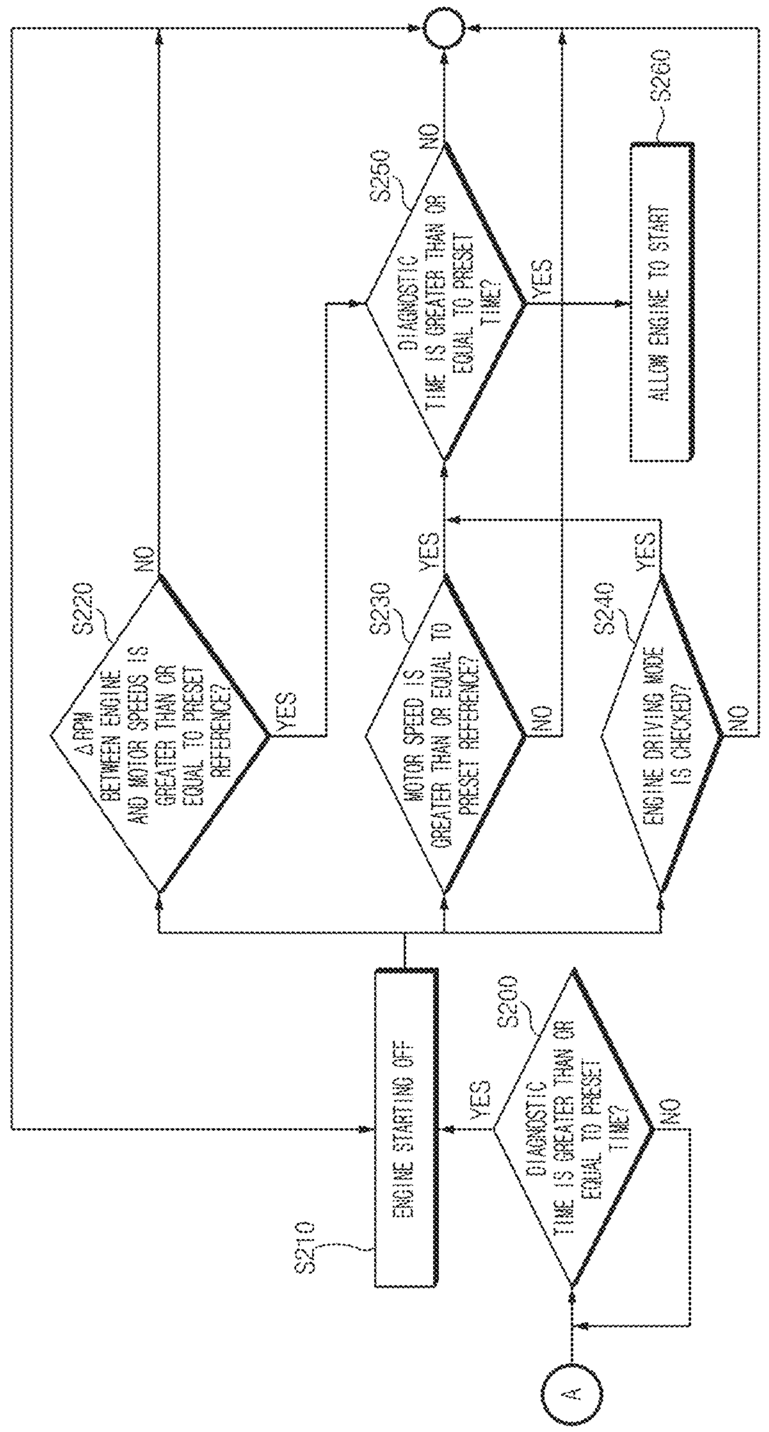

As shown in FIGS. 7A and 7B, a method for preventing a vehicle engine malfunction for a vehicle engine malfunction preventing apparatus according to an embodiment of the present disclosure will be described in more detail as follows.

As illustrated in FIGS. 7A and 7B, according to the present disclosure, it may be possible to obtain vehicle status information including engine and motor speed information of the vehicle from an MCU among vehicle control apparatuses in a case where a failure variable included in the failure variable list is speed synchronization verification (S110).

Then, according to the present disclosure, it may be possible to determine whether a RPM difference between the engine and the motor is lower than or equal to a preset RPM difference (S150), determine whether the diagnosis time is longer than or equal to a preset time in a case where the RPM difference between the engine and the motor is lower than or equal to the preset RPM difference (S200), and diagnose the vehicle engine as a malfunction to turn off the vehicle engine in a case where the diagnosis time is longer than or equal to the preset time (S210).

For example, according to the present disclosure, it may be possible to determine that the first diagnostic condition for speed synchronization verification is satisfied in a case where the RPM difference between the engine and the motor is about 120 RPM or less, and determine that the second diagnostic condition for synchronization diagnostic time verification is satisfied in response to a case where the diagnostic time is about 400 ms or more.

Furthermore, according to the present disclosure, it may be possible to obtain vehicle status information including engine speed information from an ECU among vehicle control apparatus in a case where a failure variable included in the failure variable list is engine speed verification (S120).

Then, according to the present disclosure, it may be possible to determine whether the engine speed is equal to or greater than a preset engine speed (S160), determine whether the diagnosis time is equal to or greater than the preset time in a case where the engine speed is equal to or greater than the preset engine speed (S200), and diagnose the vehicle engine as a malfunction to turn off the vehicle engine in a case where the diagnosis time is equal to or greater than the preset time (S210).

For example, according to the present disclosure, it may be possible to determine that the first diagnostic condition for engine speed verification is satisfied in response to a case where the engine speed is about 500 RPM or more, and determine that the second diagnostic condition for synchronization diagnostic time verification is satisfied in response to a case where the diagnostic time is about 400 ms or more.

Furthermore, according to the present disclosure, it may be possible to obtain vehicle status information including engine charging mode information from an ECU among vehicle control apparatus in a case where a failure variable included in the failure variable list is engine driving verification (S120).

Then, according to the present disclosure, it may be possible to determine whether the engine driving mode is a preset charging mode (S170), determine whether the diagnosis time is equal to or greater than the preset time in a case where the engine driving mode is a preset charging mode (S200), and diagnose the vehicle engine as a malfunction to turn off the vehicle engine in a case where the diagnosis time is equal to or greater than the preset time (S210).

For example, according to the present disclosure, it may be possible to determine that the first diagnostic condition for the engine driving mode is satisfied in response to a case where the engine driving mode is an idle charging mode or a partload charging mode, and determine that the second diagnostic condition for synchronization diagnostic time verification is satisfied in response to a case where the diagnostic time is about 400 ms or more.

Furthermore, according to the present disclosure, it may be possible to obtain vehicle status information including wheel speed information from wheels of the vehicle in a case where the failure variable included in the failure variable list is initial vehicle speed verification (S130).

Then, according to the present disclosure, it may be possible to determine whether the initial vehicle speed is lower than or equal to the preset vehicle speed (S180), determine whether the diagnostic time is equal to or greater than the preset time in a case where the initial vehicle speed (S200), and diagnose the vehicle engine as a malfunction to turn off the vehicle engine in a case where the diagnostic time is longer than or equal to the preset time (S210).

For example, according to the present disclosure, it may be possible to determine that the first diagnostic condition for initial vehicle speed verification is satisfied in response to a case where the initial vehicle speed is about 4 kph or less, and determine that the second diagnostic condition for synchronization diagnostic time verification is satisfied in response to a case where the diagnostic time is about 400 ms or more.

Furthermore, according to the present disclosure, it may be possible to obtain vehicle status information including transmission status mode information from the TCU among vehicle control apparatus in a case where the failure variable included in the failure variable list is transmission status mode verification (S140).

Then, according to the present disclosure, it may be possible to determine whether the transmission power is not transmitted (S190), determine whether the diagnosis time is equal to or greater than the preset time in a case where the transmission power is not transmitted (S200), and diagnose the vehicle engine as a malfunction to turn off the vehicle engine in a case where the diagnosis time is equal to or greater than the preset time (S210).

For example, according to the present disclosure, it may be configured to not perform a malfunction diagnosis of a vehicle if the transmission power is in an open status or a disengage status, if the transmission power is being transmitted, it may be possible to determine that the first diagnostic condition for the transmission status mode verification is satisfied and determine that the second diagnostic condition for synchronization diagnostic time verification is satisfied in response to a case where the diagnostic time is about 400 ms or more.

Next, according to the present disclosure, it may be possible to obtain vehicle status information including engine and motor speed information of the vehicle from the MCU in a case where a diagnostic release variable included in the diagnostic release variable list is speed synchronization verification after the vehicle engine is turned off, and determine whether a revolutions per minute (RPM) difference between the engine and the motor is greater than or equal to a preset RPM difference value (S220), determine whether the diagnostic time is greater than or equal to the preset time in a case where the RPM difference between the engine and the motor is greater than or equal to a preset RPM difference value (S250), and diagnose the vehicle engine as a normal operation to allow the vehicle engine to start in a case where the diagnostic time is greater than or equal to the preset time (S260).

For example, according to the present disclosure, it may be possible to determine that the first diagnostic release condition for speed asynchronization verification is satisfied in response to a case where the RPM difference between the engine and the motor is about 400 RPM or more, and determine that the second diagnostic release condition for asynchronization diagnostic time verification is satisfied in response to a case where the diagnostic time is about 2 seconds or more.

Next, according to the present disclosure, it may be possible to obtain vehicle status information including motor speed information from the ECU in a case where the diagnostic release variable included in the diagnostic release variable list is motor speed verification after the vehicle engine is turned off, and determine whether the motor speed is equal to or greater than the preset motor speed is determined (S230), determine whether the diagnosis time is equal to or greater than the preset time in a case where the motor speed is equal to or greater than the preset motor speed (S250), and diagnose the vehicle engine as a normal operation to allow the vehicle engine to start in a case where the diagnostic time is greater than or equal to the preset time (S260).

For example, according to the present disclosure, it may be possible to determine that the first diagnostic release condition for motor speed verification is satisfied in response to a case where the motor speed is about 600 RPM or more, and determine that the second diagnostic release condition for asynchronization diagnostic time verification is satisfied in response to a case where the diagnostic time is about 2 s or more.

Furthermore, according to the present disclosure, it may be possible to obtain vehicle status information including engine driving mode information from the ECU in a case where the diagnostic release variable included in the diagnostic release variable list is engine driving mode verification after the vehicle engine is turned off, and check the engine driving mode to determine whether it is a preset EV driving mode (S240), and determine whether the diagnostic time is longer than the preset time in a case where the engine driving mode is the preset EV driving mode (S250), and diagnose the vehicle engine as a normal operation to allow the vehicle engine to start in a case where the diagnosis time is longer than the preset time (S260).

For example, according to the present disclosure, it may be possible to determine that the first diagnostic release condition for engine driving mode verification is satisfied in response to a case where the engine driving mode is an engine stop (EngStop) mode, and determine that the second diagnostic release condition for asynchronization diagnostic time verification is satisfied in response to a case where the diagnostic time is about 2 s or more.

Then, according to the present disclosure, it may be possible to diagnose the vehicle engine as a malfunction to turn off the vehicle engine in response to a case where at least one of the second vehicle status information does not satisfy the diagnostic release conditions (S210).

Figure 8:
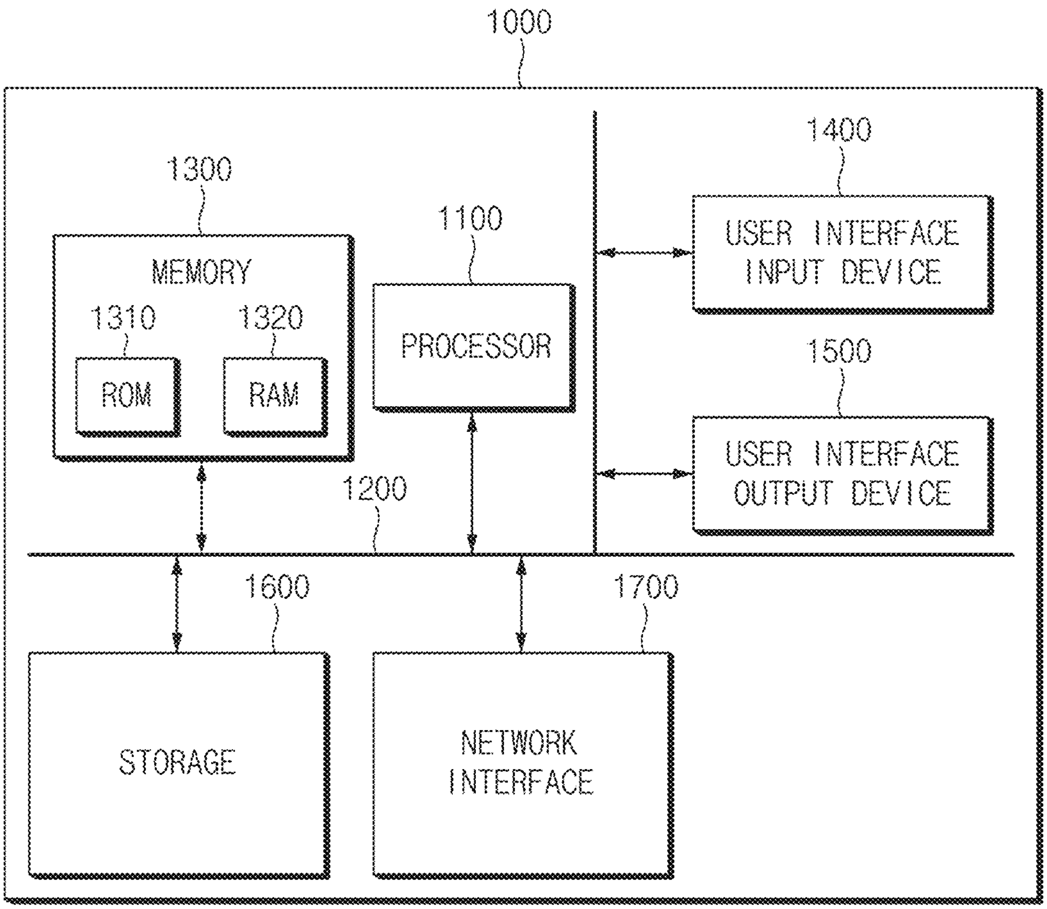
FIG. 8 illustrates an example computing system for a vehicle.

FIG. 8 illustrates an example computing system for a vehicle.

Referring to FIG. 8, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) and a random access memory (RAM).

Accordingly, steps of a method or algorithm described in connection with the exemplary embodiments included herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific IC (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

The invention claimed is:

1. A vehicle engine malfunction preventing apparatus comprising:

a memory configured to store a pre-selected failure variable list and a diagnostic release variable list; and a processor configured to diagnose whether a vehicle engine is malfunctioning based on the pre-selected failure variable list;

wherein the processor is further configured to:

obtain first vehicle status information corresponding to a failure variable based on the failure variable list;

diagnose the vehicle engine as a malfunction, thereby turning off the vehicle engine when the obtained first vehicle status information satisfies a preset diagnostic condition;

obtain second vehicle status information corresponding to a diagnostic release variable based on the diagnostic release variable list; and diagnose the vehicle engine as a normal operation, thereby allowing the vehicle engine to start, when the second vehicle status information satisfies a preset diagnostic release condition.

2. The vehicle engine malfunction preventing apparatus of claim 1, wherein the processor is further configured to obtain different first vehicle status information for each failure variable included in the failure variable list in response to obtaining the first vehicle status information.

3. The vehicle engine malfunction preventing apparatus of claim 1, wherein the processor is further configured to:

match different diagnostic conditions to each first vehicle status information;

determine whether a diagnostic condition matched to the first vehicle status information is satisfied when turning off the vehicle engine; and diagnose the vehicle engine as a malfunction, thereby turning off the vehicle engine when at least one of the first vehicle status information satisfies the diagnostic condition.

4. The vehicle engine malfunction preventing apparatus of claim 3, wherein the processor is further configured to match a first diagnostic condition for speed synchronization verification, which determines whether a revolutions per minute (RPM) difference between the engine and a motor is less than or equal to a preset RPM difference value when the first vehicle status information is engine and motor speed information of a vehicle, with a second diagnostic condition for synchronization diagnostic time verification, which determines whether a diagnostic time is greater than or equal to a preset time, and to diagnose the vehicle engine as a malfunction, thereby turning off the vehicle engine when both the first and second diagnostic conditions are satisfied.

5. The vehicle engine malfunction preventing apparatus of claim 3, wherein the processor is further configured to match a first diagnostic condition for engine speed verification, which determines whether an engine speed is equal to or greater than a preset engine speed when the acquired first vehicle status information is engine speed information, with a second diagnostic condition for synchronization diagnostic time verification, which determines whether a diagnostic time is equal to or greater than a preset time, and diagnose the vehicle engine as a malfunction, thereby turning off the vehicle engine when both the first and second diagnostic conditions are satisfied.

6. The vehicle engine malfunction preventing apparatus of claim 3, wherein the processor is further configured to match a first diagnostic condition for engine driving mode verification, which determines whether an engine driving mode is a preset charging mode when the acquired first vehicle status information is engine charging mode information, with a second diagnostic condition for synchronization diagnostic time verification, which determines whether a diagnostic time is equal to or greater than a preset time, and diagnose the vehicle engine as a malfunction, thereby turning off the vehicle engine when both the first and second diagnostic conditions are satisfied.

7. The vehicle engine malfunction preventing apparatus of claim 3, wherein the processor is further configured to match a first diagnostic condition for initial vehicle speed verification, which determines whether an initial vehicle speed is lower than or equal to a preset vehicle speed when the acquired first vehicle status information is wheel speed information, with a second diagnostic condition for synchronization diagnostic time verification, which determines whether a diagnostic time is equal to or greater than a preset time, and diagnose the vehicle engine as a malfunction, thereby turning off the vehicle engine when both the first and second diagnostic conditions are satisfied.

8. The vehicle engine malfunction preventing apparatus of claim 3, wherein the processor is further configured to match a first diagnostic condition for transmission status mode verification, which determines whether transmission power is being transmitted when the acquired first vehicle status information is transmission status mode information, with a second diagnostic condition for synchronization diagnostic time verification, which determines whether a diagnostic time is equal to or greater than a preset time, and diagnose the vehicle engine as a malfunction, thereby turning turn off the vehicle engine when both the first and second diagnostic conditions are satisfied.

9. The vehicle engine malfunction preventing apparatus of claim 1, wherein the processor is further configured to obtain different second vehicle status information for each diagnostic release variable included in the diagnostic release variable list in response to obtaining the second vehicle status information.

10. The vehicle engine malfunction preventing apparatus of claim 1, wherein the processor is further configured to match different diagnostic release conditions to each acquired second vehicle status information in a case of allowing the vehicle engine to start and determine whether the diagnostic release condition matched to the second vehicle status information is satisfied, and diagnose the vehicle engine as a normal operation, thereby allowing the vehicle engine to start when at least one of the second vehicle status information satisfies the diagnostic release condition.

11. A vehicle engine malfunction preventing method for a vehicle engine malfunction preventing apparatus, the method comprising:

obtaining, by a processor, first vehicle status information corresponding to a failure variable based on a failure variable list;

determining, by the processor, whether the first vehicle status information satisfies a preset diagnostic condition;

turning off, by the processor, a vehicle engine by diagnosing the vehicle engine as a malfunction when the first vehicle status information satisfies the preset diagnostic condition;

obtaining, by the processor, second vehicle status information corresponding to a diagnostic release variable based on a diagnostic release variable list;

determining, by the processor, whether the second vehicle status information satisfies a preset diagnostic release condition; and allowing, by the processor, the vehicle engine to start by diagnosing the vehicle engine as a normal operation when the second vehicle status information satisfies the preset diagnostic release condition.

12. The vehicle engine malfunction preventing method of claim 11, wherein the obtaining of the first vehicle status information is performed by obtaining different first vehicle status information for each failure variable included in the failure variable list by the processor.

13. The vehicle engine malfunction preventing method of claim 11, wherein the turning off of the vehicle engine is performed by matching different diagnostic conditions to each acquired first vehicle status information and determining whether the diagnostic condition matched to the first vehicle status information is satisfied, and diagnosing the vehicle engine as a malfunction to turn off the vehicle engine when at least one of the first vehicle status information satisfies the diagnostic condition, by the processor.

14. The vehicle engine malfunction preventing method of claim 13, wherein the turning off of the vehicle engine is performed by matching, by the processor, a first diagnostic condition for speed synchronization verification, which determines whether a revolutions per minute (RPM) difference between the engine and a motor is less than or equal to a preset RPM difference value when the first vehicle status information is engine and motor speed information of a vehicle, with a second diagnostic condition for synchronization diagnostic time verification, which determines whether a diagnostic time is greater than or equal to a preset time, and diagnosing the vehicle engine as a malfunction to turn off the vehicle engine when both the first and second diagnostic conditions are satisfied.

15. The vehicle engine malfunction preventing method of claim 13, wherein the turning off of the vehicle engine is performed by matching, by the processor, a first diagnostic condition for engine speed verification, which determines whether an engine speed is equal to or greater than a preset engine speed when the first vehicle status information is engine speed information, with a second diagnostic condition for synchronization diagnostic time verification, which determines whether a diagnostic time is equal to or greater than a preset time, and diagnosing the vehicle engine as a malfunction to turn off the vehicle engine when both the first and second diagnostic conditions are satisfied.

16. The vehicle engine malfunction preventing method of claim 13, wherein the turning off of the vehicle engine is performed by matching, by the processor, a first diagnostic condition for engine driving mode verification, which determines whether an engine driving mode is a preset charging mode when the first vehicle status information is engine charging mode information, with a second diagnostic condition for synchronization diagnostic time verification, which determines whether a diagnostic time is equal to or greater than a preset time, and diagnosing the vehicle engine as a malfunction to turn off the vehicle engine when both the first and second diagnostic conditions are satisfied.

17. The vehicle engine malfunction preventing method of claim 13, wherein the turning off of the vehicle engine is performed by matching, by the processor, a first diagnostic condition for initial vehicle speed verification, which determines whether an initial vehicle speed is lower than or equal to a preset vehicle speed when the acquired first vehicle status information is wheel speed information, with a second diagnostic condition for synchronization diagnostic time verification, which determines whether a diagnostic time is equal to or greater than a preset time, and diagnosing the vehicle engine as a malfunction to turn off the vehicle engine when both the first and second diagnostic conditions are satisfied.

18. The vehicle engine malfunction preventing method of claim 13, wherein the turning off of the vehicle engine is performed by matching, by the processor, a first diagnostic condition for transmission status mode verification, which determines whether transmission power is being transmitted when the acquired first vehicle status information is transmission status mode information, with a second diagnostic condition for synchronization diagnostic time verification, which determines whether a diagnostic time is equal to or greater than a preset time, and diagnosing the vehicle engine as a malfunction to turn off the vehicle engine when both the first and second diagnostic conditions are satisfied.

19. The vehicle engine malfunction preventing method of claim 11, wherein the obtaining of the second vehicle status information is performed by obtaining, by the processor, different second vehicle status information for each diagnostic release variable included in the diagnostic release variable list.

20. The vehicle engine malfunction preventing method of claim 11, wherein the allowing of the vehicle engine to start is performed by matching, by the processor, different diagnostic release conditions to each acquired second vehicle status information and determining whether the diagnostic release condition matched to the second vehicle status information is satisfied, and diagnosing the vehicle engine as a normal operation to allow the vehicle engine to start when at least one of the second vehicle status information satisfies the diagnostic release condition.

* * * * *